July 8, 1941. H. K. FREEMAN 2,248,405
SLINGER RING
Filed May 5, 1938
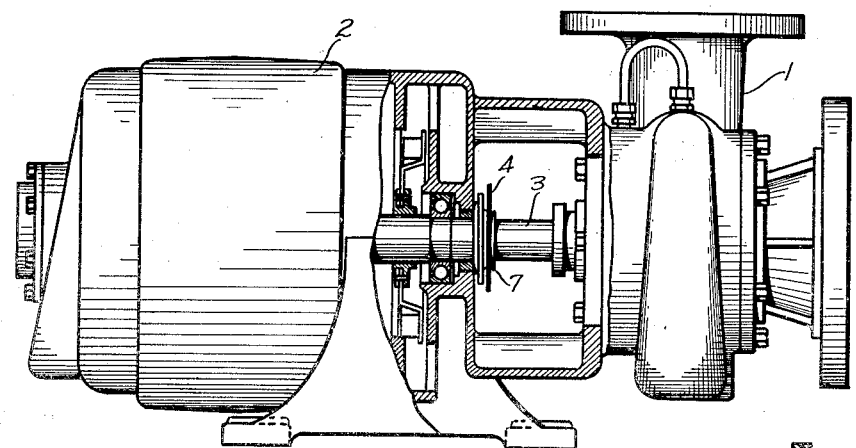
Fig.-1
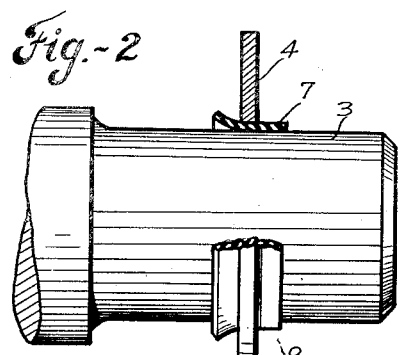
Fig.-2
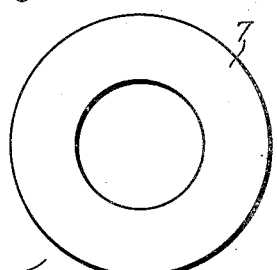
Fig.-5
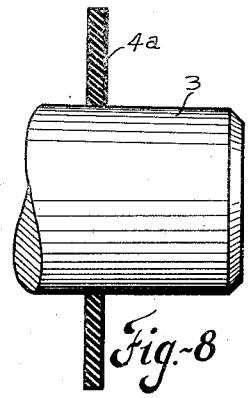
Fig.-8
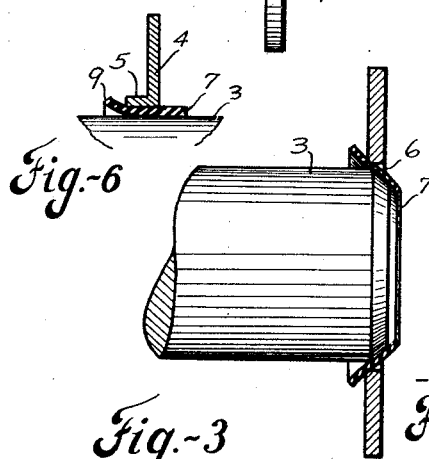
Fig.-6
Fig.-3
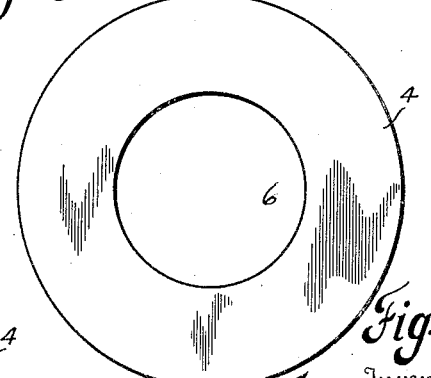
Fig.-7
Fig.-4
Inventor
Harold K. Freeman
E. L. Walker
By
Attorney Patented July 8, 1941

2,248,405

UNITED STATES PATENT OFFICE 2,248,405

SLINGER RING

Harold K. Freeman, Dayton, Ohio, assignor to The Master Electric Company, Dayton, Ohio, a corporation of Ohio Application May 5, 1938, Serial No. 206,229

3 Claims. (Cl. 286—5)

This invention pertains to "slinger rings" or shaft collars for centrifugally discharging liquids or moisture and to the means and method of mounting such rings upon a supporting shaft.

It is more or less common practice to provide peripheral collars or discs upon rotary pump shafts, or those of pulp grinders and other mechanisms subject to escape of moisture. Such peripheral collars, known as "slinger rings," are disposed in planes perpendicular to the axis of the shaft and rotate in unison therewith to intercept the leakage of moisture therealong and by centrifugal influence discharge the intercepted moisture away from the shaft. Collars or slinger rings are also frequently employed for centrifugally distributing lubricant or other liquids into a body of which a segmental portion of the rotating ring may be submerged. To securely mount such rings in adjusted position upon a shaft in such manner that the ring will not interfere with the removal of the shaft from its bearings and will not necessitate special machining operations for securing it to the shaft presents a troublesome manufacturing and assembly problem.

The object of the present invention is to obviate such difficulties by providing a slinger ring and mounting means therefor which may not only be economically manufactured but which will be efficient in use, capable of being easily and quickly assembled on the shaft, having minimum parts, and unlikely to get out of order.

A further and important object of the invention is to provide means for adjustably mounting the collar or slinger ring for axial sliding movement along the shaft into desired position and for frictionally retaining it thereon in its position of axial adjustment.

A further object of the invention is to provide a moisture-tight, self-sealing mounting for the collar.

A further object of the invention is to obviate the necessity of machining a special seat on the shaft to receive the collar or for threading the shaft for lock nuts or other mechanical attachment devices.

A further object of the invention is to provide a semi-flexible attachment means whereby the collar will be self-adjusting within limited range into the plane of rotation if displaced therefrom.

A further object is to provide a contractive mounting for the slinger ring which will closely conform to the shaft.

A further object of the invention is to provide such slinger ring construction which may be economically produced by stamping or molding the coacting parts from suitable material.

With the above primary and other incidental objects in view as will more fully appear in the specification, the invention intended to be protected by Letters Patent consists of the features of construction, the parts and combinations thereof, and the mode of operation, or their equivalents, as hereinafter described or illustrated in the accompanying drawing.

In the drawing,

Fig. 1 is a side elevation of a motor pump illustrating one type of mechanism to which the present invention is applicable.

Fig. 2 is an enlarged side elevation, partly in section, of a portion of a shaft with a slinger ring embodying the present invention mounted thereon.

Fig. 3 is a similar view illustrating the mode of applying the ring or collar to a shaft.

Figs. 4 and 5 are detail views of the slinger ring elements separated from each other.

Fig. 6 is a side elevation, partly in section, of a modification of the slinger ring construction.

Figs. 7 and 8 are detail sectional views illustrating further modifications thereof.

Like parts are indicated by similar characters of reference throughout the several views.

In Fig. 1 of the drawing there is shown a motor operated centrifugal pump unit, of which 1 is the pump and 2 an electric driving motor therefor directly connected with the pump 1 through the common shaft 3. In such pumping apparatus there is more or less seepage from the pump along the shaft 3, which it is desirable to exclude from the driving motor. To intercept and centrifugally divert such moisture before it reaches the motor 2 there is provided on the shaft 3 a slinger ring 4. The present invention is directed to the construction and assembly of such ring on the shaft. However, it is to be understood that the present slinger ring construction and frictional mounting is applicable to a very wide variety of mechanisms, and the disclosure of Fig. 1 is merely for illustrative purposes, and with no intent to unduly limit the scope or field of application of the invention.

By the present mode of mounting, the slinger ring 4 is applied to the smooth cylindrical surface of a rotary shaft 3 without a specially formed seat or conformation of the shaft, as is illustrated in Figs. 2 and 3. The collar or slinger ring 4 comprises a circular flat washer which may be stamped from plate or sheet metal, fiber, composition, or other analogous material of suitable thickness. However, if the material is relatively thin, the inner circumference may be laterally flanged as at 5 in Fig. 6. Such ring may, if desired, be formed of molded plastic. The central opening 6 of the ring 4 is of somewhat greater diameter than that of the shaft 3 on which it is to be mounted. For mounting purpose there is employed a second circular washer-like member 7, cut, molded or stamped from resilient or pliable material such as rubber, synthetic rubber, or plastic impregnated fabric, some of which materials now on the market are oil resistant. To meet different conditions of use, the mounting ring may be of malleable, pliable or deformable metal such as lead or metallic alloys. In any event, such mounting collar should be of material resistant to the seepage liquid.

The central opening of such mounting ring 7 is of somewhat less diameter than that of the shaft on which it is to be engaged, thereby necessitating that the mounting ring 7 be subjected to distension or stretching strain while being applied to the shaft, thus insuring a close, tight joint. While the central opening 6 of the slinger ring 4 is of greater diameter than that of the shaft, it is of less diameter than the shaft diameter plus twice the thickness of the mounting collar 7, whereby the material of the mounting collar is necessarily subjected to compressive force between the inner circumference of the slinger ring 4 and the periphery of the shaft when assembled thereon.

The manner of applying the slinger ring and its mounting is clearly illustrated in Fig. 3. The pliable sealing and mount ring 7 is first positioned concentrically against the end of the shaft and the rigid ring 4 is positioned against the pliable mount ring 7, but also concentric with the shaft. The two rings are then conjointly forced over the end of the shaft. In so doing, the mounting ring 7 is distended and somewhat distorted out of its flat form so that it tends to extend along the shaft beyond opposite sides of the surrounding slinger ring. The pliable mount ring being initially smaller than the shaft, it conforms tightly thereto, and being of initially greater thickness than the clearance space between the inner circumference of the slinger ring and the periphery of the shaft, the mount ring 7, which after application to the shaft assumes the shape of a band or sleeve, is medially compressed in the plane of the slinger ring 4. This tends to cause the margin of the mounting ring to upturn at 9 at one side of the ring 4, thereby affording a flange or bead additional to the ring 4 from which moisture is centrifugally discharged. By this means the slinger ring 4 is flexibly or resiliently mounted in leak-tight relation with the shaft, upon which it is capable of axial sliding motion into any desired position, and when so mounted performs the function of multiple rings, since the outturned margins of the mounting ring 7 supplement the action of the ring 4 in discharging moisture.

Due to the flexibility of its mounting, the slinger ring may yield under impact and therefore is not likely to be broken or bent by impact. Also, if for any reason it is displaced or bent into an askew relation, it will tend to right itself under a centrifugal influence and automatically return to coincident relation with the plane of rotation.

In Fig. 7 there is shown the rigid slinger ring element 4 about the inner periphery of which there is engaged a rubber or other resilient grommet 10 of somewhat less internal diameter than the diameter of the shaft. The grommet or inner resilient lining of the slinger ring may be vulcanized fixedly upon the inner margin of the ring 4, or may be independently molded with a peripheral groove 11 in which the margin of the ring is seated. In forcing the grommet over the shaft with the ring 4 engaged therewith, the grommet 10 is distended and distorted as shown by dotted lines into close grasping engagement with the periphery of the shaft.

In Fig. 8 there is shown a modification wherein the entire slinger ring 4a is made of pliable semi-resilient material. Such single element ring is cut or stamped from rubber, fiber, composition, plastic impregnated fabric or analogous material. The central concentric opening in the collar or ring 4a is of slightly less diameter than that of the shaft whereby in applying it thereto the ring is subjected to distension strain sufficient to cause it to closely conform to the shaft. Such flexible slinger rings are preferably, but not necessarily mounted in pairs or groups. It embodies in the single element the idea of a contractable contacting portion surrounding the shaft from which the effective slinger portion extends peripherally in the plane of rotation.

Either of the forms of embodiment of the invention well afford secure engagement of the ring with the shaft, yet permit axial sliding adjustment thereon to any desired position and avoid the necessity of specially machining the shaft for reception of the ring, and achieve the advantages of resilient mounting, perfect seal self-alignment and are readily detachable to enable removal of the shaft from its bearings.

Such construction also will enable a limited number of rings of different diameters to suffice for a greater number of different shaft diameters by applying two or more mounting rings 7 one on another, until sufficient body is formed to compensate for the difference in clearance space between the interior of the ring 4 and the surface of the shaft. Such thickness of resilient mounting body should always be greater than the clearance space so that the mounting collar is subjected to compression in the plane of the ring 4.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. The herein described method of mounting a slinger ring upon a rotary shaft including disposing the ring in concentric relation upon a shaft for unison rotation in a plane substantially perpendicular to the axis thereof, providing in association therewith a flat disc-like expansible inner shaft engaging portion of initially less internal diameter than the shaft, distorting the inner shaft engaging portion in assembly with the slinger ring on the shaft, and expanding such inner portion within the ring by thrust engagement thereof over the end of the shaft, the construction and arrangement being such that the said inner portion is subjected to compressioned leak-tight frictional engagement with the shaft while comprising the sole support for the ring.

2. A slinger ring assembly including a flat rigid disc mounted on a shaft for rotation in a plane perpendicular to the axis of the shaft and having an opening therein of greater diameter than that of the shaft on which it is mounted an initially flat rubber disc having an opening therein of less diameter than that of the shaft interposed under compression about the shaft and within the opening of the rigid disc and distorted from its original shape whereby it projects axially of the shaft beyond the opposite faces of the rigid disc, one margin of the rubber disc being deflected away from the shaft incident to its confinement under compression between the rigid disc and the shaft.

3. A slinger ring assembly including a flat rigid ring mounted on a shaft for rotation in a plane perpendicular to the axis of the shaft and having an opening therein of greater diameter than that of the shaft on which it is mounted and an initially flat disc-like flexible seating collar for the rigid ring having initially a concentric opening of less diameter than that of the shaft which when distended over the shaft and under compression within the opening of the rigid ring extends in opposite directions beyond the lateral faces of the ring.

HAROLD K. FREEMAN.